United States Patent [19]
Goossens

[11] Patent Number: 4,524,487
[45] Date of Patent: Jun. 25, 1985

[54] APPARATUS FOR THE AUTOMATIC STUNNING OF SLAUGHTER CATTLE

[75] Inventor: Jan B. R. Goossens, St. Lievens-Houtem, Belgium

[73] Assignee: Machinefabriek G.J. Nijhuis B.V., Winterswijk, Netherlands

[21] Appl. No.: 387,619

[22] Filed: Jun. 11, 1982

[51] Int. Cl.³ .............................................. A22B 3/00
[52] U.S. Cl. ...................................... 17/1 E; 128/783
[58] Field of Search ....................... 128/783; 198/626; 17/1 A, 16

[56] References Cited

U.S. PATENT DOCUMENTS

| | | | |
|---|---|---|---|
| 1,857,658 | 5/1932 | Pfretzschner | 128/783 |
| 2,185,949 | 1/1940 | Regensburger | 17/1 |
| 3,177,526 | 4/1965 | Braun | 17/45 |
| 3,314,103 | 4/1967 | Rains | 17/45 |
| 3,657,767 | 4/1972 | Schmidt | 17/1 A |
| 3,753,484 | 8/1973 | Aivola et al. | 198/626 |
| 3,825,192 | 7/1974 | Knight | 198/626 |
| 3,996,644 | 12/1976 | Andersson | 17/1 A |
| 4,353,147 | 10/1982 | Nijhuis | 17/1 E |
| 4,406,036 | 9/1983 | Nijhuis | 17/1 A |

FOREIGN PATENT DOCUMENTS

| | | |
|---|---|---|
| 216412 | 7/1958 | Australia . |
| 696874 | 10/1964 | Canada . |
| 693639 | 11/1930 | France . |
| 6702456 | 8/1967 | Netherlands . |
| 7514368 | 6/1976 | Netherlands . |
| 1227371 | 4/1971 | United Kingdom . |

*Primary Examiner*—Lee S. Cohen
*Assistant Examiner*—Steven Falk
*Attorney, Agent, or Firm*—Arnold, White & Durkee

[57] ABSTRACT

An apparatus for the automatic electric stunning of slaughter animals, in particular pigs, is disclosed. Two gravity biased pendulum mounted electrodes are placed next to each other in the V-shaped passage formed between two endless conveyors. The electrodes are suspended from a transverse shaft placed high above the conveyors so that the electrodes, like a pendulum, can be pushed aside in the direction of transportation by the animal to be stunned and return into the vertical starting position by gravity. The electrodes are preferably positioned close to the exit of the conveyors with the receiving surface sufficiently low to make sure that a stunned animal does not prevent the return of the electrodes.

14 Claims, 2 Drawing Figures

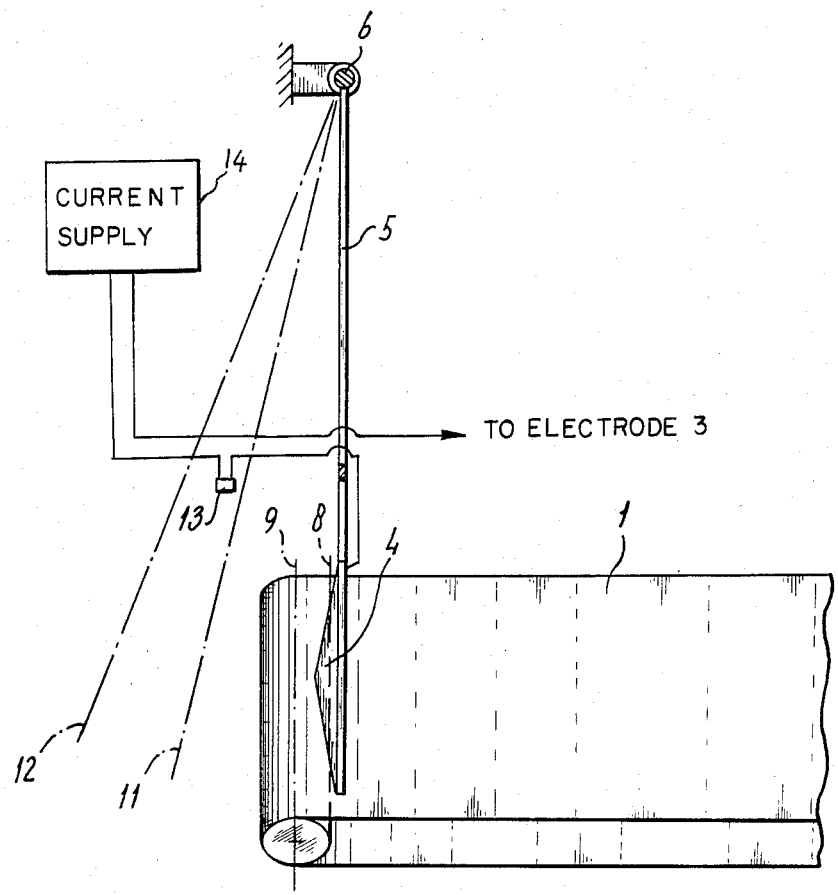

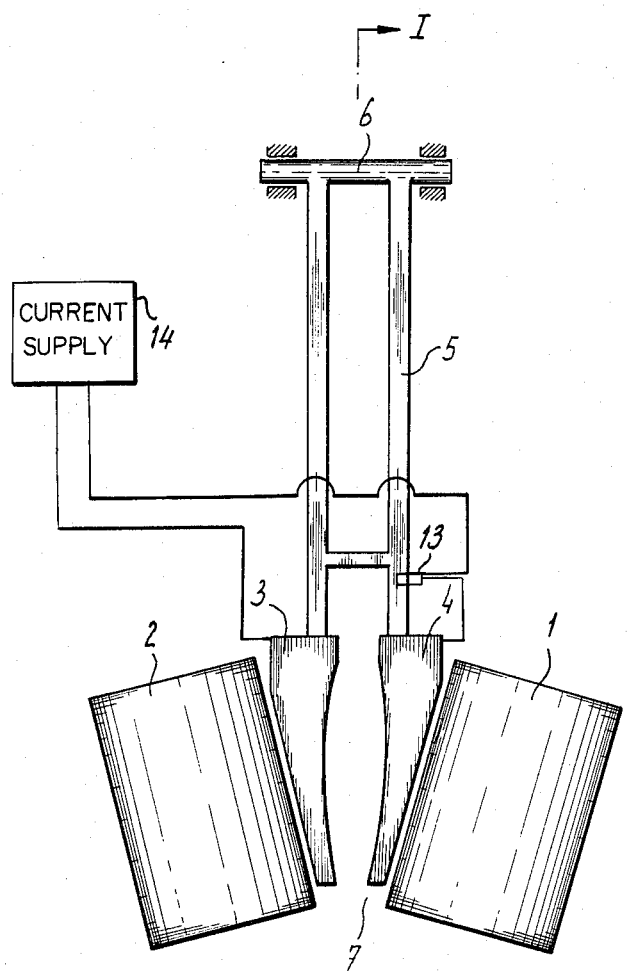

APPARATUS FOR THE AUTOMATIC STUNNING OF SLAUGHTER CATTLE

BACKGROUND OF THE INVENTION

The present invention relates to an apparatus for the automatic electric stunning of slaughter animals, in particular pigs. The apparatus includes two endless conveyors having their operative surfaces arranged with respect to each other such that a V-shaped passage is formed. The conveyors run in synchronism and parallel to each other. The apparatus further includes two electrodes insulated with respect to each other and extending into the V-shaped passage from above in a position next to each other. The electrodes are swingable about a horizontal transverse axis mounted above the conveyors. An apparatus of this type is known from the published Dutch Patent Application No. 7904935.

According to said prior proposal the electrodes are swingably mounted upon horizontal transverse axes in a carriage which can be moved in the longitudinal direction of the conveyors. The electrodes are held in position by springs and can be moved against the springs by the stunned animal. The springs are combined with dampers to ensure proper contact between the electrodes and the head of the animal. The carriage starts its movement as soon as a sensing current between the electrodes establishes the presence of the correct animal so that during the passage of the stunning current relative movements between the electrodes and the animal's head are avoided.

This known apparatus has an excellent performance and is able to stun a great number of animals per hour without any insufficient stunning or damage of the meat.

This known apparatus, however, is rather complicated and expensive to manufacture.

SUMMARY OF THE INVENTION

One purpose of the invention is to provide an apparatus which can be manufactured in a very simple way.

According to the invention, this purpose is achieved in that the electrodes in the manner of a pendulum are suspended from a transverse axis placed high above the conveyors. According to the present invention, the animal, the head of which comes into contact with the electrodes, will move the electrodes, which electrodes now only give way against their gravity component derived from the weight of the entire pendulum. Due to the great length of the pendulum, the position of the electrodes during the stunning time hardly changes its position with respect to the animal's head so that proper stunning can take place during to the time that the electrodes rest against the animal's head. Preferably the two electrodes together are positioned at an angle with respect to each other as to form a V pointing in the direction of movement.

The pendulum should have a length of at least two meters calculated from the center of the electrodes towards the axis at the top of the pendulum.

Preferably the pendulum cooperates with an end switch 13 interrupting the current supply 14 to the electrodes before the electrodes leave the outer end of the V-shaped passage. This is necessary to avoid that there exists tension between the electrodes as soon as they start to move over the body of the stunned animal as well as to avoid contact with personnel outside the restrainer formed by the conveyors.

Preferably the electrodes in the vertical starting position of the pendulum are present in a transverse plane lying closely in front of the transverse plane through the axes of the reversing wheels of the conveyors with the lower edges of the conveyors at the outer end above a receiving surface with a distance of at least 65 cm.

Positioning the electrodes close to the exit end of the conveyor with the receiving surface at such a lower level that the stunned animal falls down sufficiently to free the V-shaped passage, ensures that the electrodes with a minimal swinging angle permit the electrodes to return readily into the vertical starting position to meet the next animal. Further undesired contact of the electrodes with the other parts of the animal is avoided.

The invention now will be further elucidated with reference to the drawings.

BRIEF DESCRIPTION OF THE DRAWINGS

FIG. 1 is a side-view partly cross-section according to the line I—I of FIG. 2 of the apparatus according to the invention.

FIG. 2 is a front view of the apparatus of FIG. 1.

DESCRIPTION OF A PREFERRED EMBODIMENT

The apparatus shown in the drawings has two endless conveyors 1 and 2, one of which only being shown in FIG. 1 Said two conveyors form a so-called restrainer holding the animal to be stunned at its belly.

The two electrodes are indicated with reference numerals 3 and 4. The electrodes 3 and 4 are rigidly attached to a frame 5 forming a pendulum which is free swingably suspended from a transverse axis 6 located at a high level above the conveyors 1 and 2. This frame 5 can have a length of two meters or more.

As shown in FIG. 1, the electrodes 3 and 4 in their vertical starting position can lie in a plane 8 which is close to the plane 9 through the axes of the reversing wheels of the two conveyors 1 and 2. An animal stunned will move the electrodes 3 and 4 to the left, and after the stunning the animal will fall out of the exit of the conveyors 1 and 2 and upon the receiving surface 10. The V-shaped passage in this way is immediately free from the stunned animal, and the pendulum 5 with electrodes 3 and 4 can return immediately into the position shown in FIG. 1 without unnecessary contact with the animal and in time to stun the next animal.

The pendulum 5 may cooperate with a switch, 13 shown schematically, but operated when the pendulum 5 passes the position indicated with the interrupted line 11. This switch 13 can be made such that, upon return of the pendulum 5 from the position shown with line 12 towards the starting position shown in full lines, the electrodes 3 and 4 are put under electric tension again.

The apparatus according to the invention is of a very simple construction. It is to be understood that various modifications may be made in the illustrated embodiment without departing from the spirit of the invention. The description of the presently preferred embodiment is given to facilitate understanding of the invention by those skilled in the art. The invention is not limited to the illustrated embodiment, but is defined by the scope of the claims.

I claim:

1. An apparatus for the automatic stunning of animals to be slaughtered, comprising:

two endless conveyors having their operative surfaces arranged with respect to each other such that a V-shaped passage is formed, the conveyors being parallel to each other, the conveyors being adapted to run synchronously; and, two electrodes insulated with respect to each other and extending into the V-shaped passage from above, said electrodes being swingable about a horizontal transverse axis mounted above the conveyors, the electrodes being mounted upon a pendulum suspended from the transverse axis placed high above the position where an animal would be located in the V-shaped passage during stunning, the electrodes having an initial position where the pendulum is positioned vertically in a transverse plane located closely in front of the transverse plane through the axes of reversing wheels of the conveyors at an outlet end of the conveyors so that the animal is permitted to drop from the conveyors to a receiving surface without moving the electrodes to a substantially displaced position, the electrodes being operative to engage the animal's head for stunning, the pendulum being long enough that the electrodes swing through an arc to a displaced position as the animal is carried by the conveyors such that vertical movement of the electrodes while engaging the animal's head is not substantial, the pendulum being operative to return to its initial position from said displaced position solely under the force of gravity.

2. The apparatus according to claim 1, further comprising:

an end switch which cooperates with the pendulum, a current supply electrically connected to the electrodes, said switch being operative to interrupt the current supply to the electrodes prior to the electrodes leaving the outlet end of the V-shaped passage.

3. The apparatus according to claim 1 or 2, wherein:

the lower edge of said conveyors at said outlet end lie above the receiving surface a distance of at least 65 centimeters.

4. The apparatus according to claim 1, wherein:

the electrodes are mounted upon a single pendulum.

5. An apparatus for the electric stunning of slaughter animals having gravity biased pendulum mount electrodes, comprising:

two endless conveyors, said conveyors having their operative surfaces arranged to form a substantially V-shaped passageway therebetween, the conveyors being operable at a synchronized rate, the conveyors being generally parallel to each other, the conveyors being adapted to receive an animal to be stunned;

two electrodes, the electrodes being insulated from each other, the electrodes extending side by side into the V-shaped passageway, the electrodes being of such a shape and mounted in such a manner that they are adapted to engage the sides of the head of an animal to be stunned substantially at the same time; and, a pendulum mount for the electrodes, the electrodes being connected to the pendulum mount, the pendulum mount being swingably supported about a transverse axis located above the conveyors, the transverse axis upon which the pendulum mount is supported being located at such a height about the position that an animal's head will occupy during stunning, that when the electrodes operatively engage the animal's head, the electrodes will swing through an arc as the animal is carried by the conveyors during stunning such that vertical movement of said electrodes while engaging the animal's head is not substantial, the electrodes being operative to return to an initial position occupied by the electrodes before engaging the animal's head primarily in response to the force of gravity.

6. The apparatus according to claim 5, wherein:

the transverse axis upon which the pendulum is supported is located at least two meters above the position that the animal's head will occupy during stunning.

7. The apparatus according to claim 5, wherein the pendulum mount has a length of at least two meters.

8. The apparatus according to claim 5, the conveyors having an outlet end, further comprising:

a receiving surface located at a distance below a lower edge of said conveyors at the outlet end of the V-shaped passageway, whereby said electrodes begin a stunning operation in an initial vertical position in a transverse plane located in close proximity to the outlet end of the conveyors, said electrodes being operative to engage the animal's head and to move substantially horizontally while the animal is being stunned, said electrodes being operative to continue moving in an arc to leave said passageway, thereby permitting said animal to drop onto said receiving surface so that no part of said animal remains in said arc, said electrodes being further operative to return to said initial position solely under the force of gravity.

9. The apparatus according to claim 8, wherein said receiving surface is located at least 65 centimeters below the lower edge of the conveyors.

10. The apparatus according to claim 5, claim 7, claim 8, or claim 9, wherein the pendulum mount is rigid.

11. The apparatus according to claim 10, wherein the electrodes are mounted upon a single pendulum mount.

12. The apparatus according to claim 10, wherein the electrodes each have an outer edge near an operative surface of one of the endless conveyors, said outer edge being substantially straight, said outer edge being located close to the operative surface of said conveyor to inhibit an animal from placing its nose between said electrode and said conveyor, the electrodes having an opening therebetween to encourage an animal to put its nose between the electrodes.

13. An apparatus for the electric stunning of slaughter animals having gravity biased pendulum mounted electrodes, comprising:

two endless conveyors, said conveyors having their operative surfaces arranged to form a substantially V-shaped passageway therebetween, said conveyors being operable at a synchronized rate;

a rigid pendulum frame swingably mounted about a transverse axis located above said conveyors, said pendulum frame having a length of at least two meters;

two electrodes both connected to the pendulum frame, said electrodes being insulated with respect to each other and extending side by side into said passageway, said electrodes being of such a shape and mounted in such a manner that they are operative to engage the sides of the head of the animal to be stunned substantially at the same time;

a receiving surface located at least 65 centimeters below the lower edge of said conveyors at an outlet end of said passageway;

said electrodes beginning the stunning operation in an initial vertical position in a transverse plane located in close proximity to the outlet end of said conveyors, said electrodes being operative to engage the animal's head and to move substantially horizontally while the animal is being stunned, the length of said pendulum being sufficiently long that the electrodes move through an arc with a sufficiently long radius while an animal is being stunned that the arc is substantially flat, said electrodes being operative to continue moving in an arc and leave said passageway, thereby permitting said animal to drop onto said receiving surface so that no part of said animal remains in said arc, said electrodes being further operative to return to said initial position solely under the force of gravity.

14. The apparatus according to claim 13, further comprising:

an end switch which cooperates with the pendulum frame, a current supply electrically connected to said electrodes, said switch being operative to interrupt the current supply to said electrodes prior to the electrodes leaving said passageway.

* * * * *

UNITED STATES PATENT AND TRADEMARK OFFICE
CERTIFICATE OF CORRECTION

PATENT NO. : 4,524,487
DATED : June 25, 1985
INVENTOR(S) : Jan B. R. Goossens

It is certified that error appears in the above-identified patent and that said Letters Patent is hereby corrected as shown below:

```
Column 1, line 55, after "during", delete -- to --.

Column 2, line 50, change "switch, 13" to -- switch 13, --.

Column 3, line 67, change "about" to -- above --.

Column 4, line 17, change "claim 5," to -- claim 7, --.
```

Signed and Sealed this

First Day of October 1985

[SEAL]

Attest:

Attesting Officer

DONALD J. QUIGG

Commissioner of Patents and
Trademarks—Designate